Patented Nov. 25, 1947

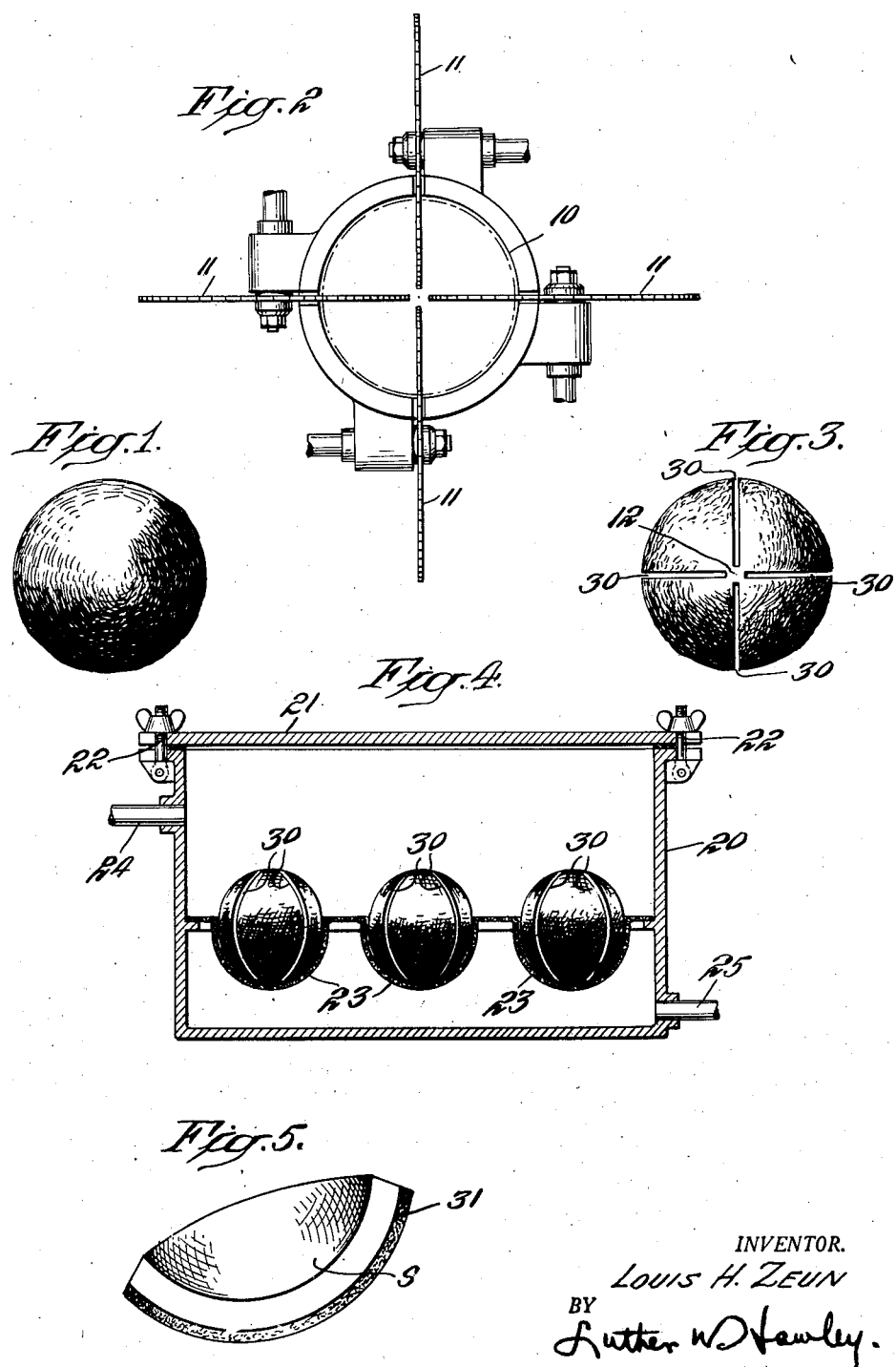

2,431,602

UNITED STATES PATENT OFFICE 2,431,602

METHOD OF TREATING COCONUTS TO RELEASE THE MEAT FROM THE SHELL

Louis H. Zeun, Naugatuck, Conn., assignor to Peter Paul, Inc., Naugatuck, Conn., a corporation of Delaware Application March 3, 1944, Serial No. 524,963

2 Claims. (Cl. 146—227)

This invention relates to the preparation of coconut meat preparatory to shredding.

Coconuts have a relatively thick, tough, husk which is first split and then removed. This leaves an inner relatively thin shell which tightly encases the coconut meat.

In order to facilitate the removal of this shell it is customary to place the coconut in a retort where it is heated for a considerable period of time, usually by steam. This heating to a high temperature and for such a period of time is necessary since the coconut shell is closed and liquid is contained in the center of the nut. Such heating is detrimental to the treatment of the coconuts since the oil cells are broken down and the oil comes to the surface and is concentrated in the outer portion of the nut. This is not desirable since the oil should be evenly distributed through the meat.

This invention has for its salient object to provide an improved method of processing coconuts preparatory to shredding whereby the time required for heating and the amount of heat required are materially reduced.

Another object of the invention is to provide a method of processing coconuts preparatory to the removal of the shell so worked out that the removal of the shell will be facilitated.

Further objects of the invention will appear from the following specification taken in connection with the drawings which form a part of this application, and in which Fig. 1 is an end view of a coconut;

Fig. 2 is a diagrammatic plan view illustrating apparatus which may be used for slitting the coconut;

Fig. 3 is a view similar to Fig. 1 but showing the coconut having inwardly extending radial slits;

Fig. 4 is a sectional elevation illustrating somewhat diagrammatically a retort for heating the slit coconuts; and Fig. 5 is a perspective view showing one of the coconut sections after the shell and coconut have been split or the sections have been separated.

In carrying out the invention a coconut is first passed through suitable apparatus for forming openings, preferably slits, in the coconut. This apparatus may take the form illustrated in Fig. 2 in which there is shown a pipe or tube 10 adapted to receive the coconuts and a plurality of cutting disks or saws 11 disposed radially relative to the axis of the tube 10. These saws extend through the wall of the tube in radial directions and, as shown in the drawing, the saws divide the coconut into four sections. However, attention is called to the fact that the saws are spaced apart at their inner peripheries and do not entirely cut the nut into four sections since at each end, as shown in Fig. 3 at 12, there is a portion of the coconut which is not cut.

When the nut is perforated in the manner above described, or if desired in some other suitable manner, the liquid inside the nut can drain out.

The nuts are then placed in a retort, which may take the form shown in Fig. 4. In this figure there is shown a casing 20 having a lid or cover 21 which can be clamped down by wing nuts mounted on pivoted bolts 22.

Inside the casing 20 there are provided suitable cages, baskets or supports 23 for supporting the nuts in the casing. In Fig. 4 there is shown an inlet pipe 24 for conducting steam or, if desired, hot air, to the chamber in the casing 20 and there is also shown an outlet pipe 25.

After the water has been drained from the nuts they are placed in the baskets or cages 23 in the casing 20 and the cover is then clamped down and steam under pressure is passed through the chamber. This steam heats the nuts and the heat has ready access to the inside of the nut through the slits 30 formed by the saws 11. After the nuts have been sufficiently exposed to the heat which penetrates the shells as well as the meat, the nuts are removed from the heating chamber and the sections S are then separated. After this has been done the shell 31 can be readily removed since due to the heat the meat or inner portion of the coconut is shrunk or contracted relative to the shell by the heat. A blunt edged knife similar to an oyster knife can be inserted between the meat and the shell, easily separating the shell from the meat, without danger of breaking the meat in small pieces.

Since the heat, as above stated, has ready access to the inside of the nut, very much less time is required to process the nuts and, therefore, the oil cells are not broken down and the oil is not concentrated in the outer portion near the shell.

Although certain specific apparatus has been illustrated, it should be understood that the invention is not limited to any particular apparatus and that other forms of apparatus may be utilized if desired.

Although one specific embodiment of the invention and of the method has been particularly described, it should be understood that applicant does not intend to be limited to the particular details recited, but that changes in the method may be made without departing from the spirit or scope of the invention, as expressed in the following claims.

What I claim is:

1. The method of processing coconuts for shredding which consists of removing the husks, slitting the nuts radially, thereby permitting the water to drain out, the radial slits extending inwardly but terminating short of the axis whereby the nut segments are connected at the ends, subjecting the slit nuts to a bath of steam, whereby the meat will be loosened from the shell, breaking the nut into segments, and removing the shell from the meat.

2. The method of processing coconuts for shredding which consists of forming openings in the nut to permit the water to drain out, subjecting the perforated nuts to a bath of steam whereby the meat will be loosened from the shell, breaking the nut into sections, and removing the shell therefrom.

LOUIS H. ZEUN.

REFERENCES CITED

The following references are of record in the file of this patent:

UNITED STATES PATENTS

| Number | Name | Date |
| --- | --- | --- |
| 1,626,361 | Schmitt | Apr. 26, 1927 |
| 1,992,479 | Estrada et al. | Feb. 26, 1935 |
| 2,318,265 | Stagmier | May 4, 1943 |

FOREIGN PATENTS

| Number | Country | Date |
| --- | --- | --- |
| 235,241 | Great Britain | June 17, 1926 |